United States Patent
Park et al.

(10) Patent No.: US 10,445,602 B2
(45) Date of Patent: Oct. 15, 2019

(54) APPARATUS AND METHOD FOR RECOGNIZING TRAFFIC SIGNS

(71) Applicant: Mando-Hella Electronics Corporation, Incheon (KR)

(72) Inventors: Ha-Bit Park, Incheon (KR); Ki-Man Kim, Gyeonggi-do (KR); Beom-Kyu Kim, Incheon (KR); Shinwook Kim, Seoul (KR)

(73) Assignee: MANDO-HELLA ELECTRONICS CORPORATION, Incheon (KR)

( * ) Notice: Subject to any disclaimer, the term of this patent is extended or adjusted under 35 U.S.C. 154(b) by 0 days.

(21) Appl. No.: 15/808,873

(22) Filed: Nov. 9, 2017

(65) Prior Publication Data
US 2018/0349716 A1    Dec. 6, 2018

(30) Foreign Application Priority Data
May 30, 2017    (KR) ........................ 10-2017-0066998

(51) Int. Cl.
G06K 9/00    (2006.01)
G06K 9/42    (2006.01)
(Continued)

(52) U.S. Cl.
CPC ....... *G06K 9/00818* (2013.01); *G06K 9/3241* (2013.01); *G06K 9/42* (2013.01);
(Continued)

(58) Field of Classification Search
CPC .......... G06K 9/00818; G06K 9/00791; G06K 9/3241; G06K 9/42; G06K 9/6228;
(Continued)

(56) References Cited

U.S. PATENT DOCUMENTS 6,266,442 B1 *  7/2001  Laumeyer ......... G06K 9/00818
                                                  382/104
7,466,841 B2 * 12/2008  Bahlmann ......... G06K 9/00818
                                                  382/103
(Continued)

FOREIGN PATENT DOCUMENTS

KR    10-2015-0082823    7/2015
KR    10-2015-0085988    7/2015
(Continued)

OTHER PUBLICATIONS

Rajesh et al. "Coherence Vector of Oriented Gradients for Traffic Sign Recognition using Neural Networks." Proceedings of International Joint Conference on Neural Networks, Jul. 31, 2011, pp. 907-910 (Year: 2011).*

(Continued)

*Primary Examiner* — Jon Chang
(74) *Attorney, Agent, or Firm* — Ladas & Parry, LLP (57) ABSTRACT

An apparatus for recognizing traffic signs normalizes a window of a predetermined size for a region of interest set in an image frame inputted from an image sensor, generates a first input vector, extracts a candidate region of a traffic sign based on feature pattern information of a neuron having a feature pattern vector, stores the coordinates of the extracted traffic sign candidate region, converts the image size of the extracted candidate region, normalizes a window of a predetermined size for the candidate region of the converted image size, generates a second input vector, determines traffic sign content information of a neuron having a content pattern vector, stores the determined traffic sign content information, and recognizes the location and content of the traffic sign based on the coordinates of the stored candidate regions and the content information of the stored traffic sign when the traffic sign disappears.

6 Claims, 9 Drawing Sheets

(51) Int. Cl.
  *G06K 9/62* (2006.01)
  *G06K 9/46* (2006.01)
  *G06K 9/32* (2006.01)
  *G06T 7/70* (2017.01)
  *G06T 7/13* (2017.01)

(52) U.S. Cl.
  CPC ......... *G06K 9/4609* (2013.01); *G06K 9/4642* (2013.01); *G06K 9/627* (2013.01); *G06K 9/6215* (2013.01); *G06K 9/6228* (2013.01); *G06K 2009/6213* (2013.01); *G06T 7/13* (2017.01); *G06T 7/70* (2017.01)

(58) Field of Classification Search
  CPC .. G06K 9/4642; G06K 9/4609; G06K 9/6215; G06K 2009/6213; G06K 9/4604; G06K 9/627; G06T 7/70; G06T 7/13
  See application file for complete search history.

(56) References Cited

U.S. PATENT DOCUMENTS

| | | | |
|---|---|---|---|
| 2009/0074249 A1* | 3/2009 | Moed | G06K 9/00818 382/104 |
| 2015/0193663 A1* | 7/2015 | Oh | G06K 9/00818 382/104 |
| 2017/0206434 A1* | 7/2017 | Nariyambut Murali | G06K 9/628 |
| 2017/0323452 A1* | 11/2017 | Chen | G06K 9/00818 |
| 2018/0189580 A1* | 7/2018 | Lee | G06K 9/00818 |
| 2018/0300564 A1* | 10/2018 | Kwant | G06K 9/00818 |

FOREIGN PATENT DOCUMENTS

| | | |
|---|---|---|
| KR | 10-2016-0093464 | 8/2016 |
| KR | 10-2016-0132331 | 11/2016 |

OTHER PUBLICATIONS

Abedin et al. "Traffic Sign Recognition Using Hybrid Features Descriptor and Artificial Neural Network Classifier." 19th International Conference on Computer and Information Technology, Dec. 18, 2016, pp. 457-462 (Year: 2016).*

Kuo et al. "Two-Stage Road Sign Detection and Recognition." IEEE International Conference on Multimedia and Expo, Jul. 2, 2007, pp. 1427-1430 (Year: 2007).*

Yamamoto et al. "Japanese Road Signs Recognition using Neural Networks." SICE Annual Conference Sep. 14, 2013, pp. 1144-1150 (Year: 2013).*

Broggi et al. "Real Time Road Signs Recognition." IEEE Intelligent Vehicles Symposium, Jun. 13, 2007, pp. 981-986 (Year: 2007).*

Notice of Allowance dated Feb. 19, 2018 for Korean Patent Application No. 10-2017-0066998 and its English machine translation provided by Applicant's foreign council.

* cited by examiner

| FRAME<br>CANDIDATE | | n | n+1 | n+2 | ..... | n+28 | n+29 | n+30 |
|---|---|---|---|---|---|---|---|---|
| CANDIDATE 1 | SIGN CONTENT | 80 | 60 | Unknown | ..... | 80 | 80 | 80 |
| | COORDINATE (X1,X2,Y1,Y2) | (100,130, 30,50) | (102,133, 31,51) | ... | ..... | ... | ... | (110,145, 34,60) |
| | | | | | | | | |
| CANDIDATE 2 | SIGN CONTENT | Unknown | Unknown | Unknown | ..... | Unknown | Unknown | Unknown |
| | | | | | | | | |
| | | | | | | | | |
| ⋮ | | | | | | | | |
| CANDIDATE n | SIGN CONTENT | Unknown | Unknown | Unknown | ..... | Unknown | Unknown | Unknown |
| | | | | | | | | |
| | | | | | | | | |

APPARATUS AND METHOD FOR RECOGNIZING TRAFFIC SIGNS

CROSS-REFERENCE TO RELATED APPLICATION(S)

This application claims the benefit of Korean Patent Application No. 2017-0066998, filed on May 30, 2017 in the Korean Intellectual Property Office, the disclosure of which is incorporated herein by reference.

BACKGROUND

1. Technical Field

The present disclosure relates to an apparatus and a method for recognizing traffic signs, and more particularly, to an apparatus and a method for recognizing traffic signs by analyzing road images detected by a camera.

2. Description of the Related Art

In general, various situations of a road may be determined from image information detected by a camera. Based on such image information of a road, it is possible to provide convenience to a driver and prevent an accident.

Traffic Sign Recognition (TSR) technology can prevent a driver's carelessness by guiding warning signs on roads that the driver may pass by without great attention.

Conventionally, various kinds of image processing algorithms have been used to implement the TSR function, so it is essential to use a high-performance CPU (central processing unit) and a DSP (digital signal processor).

Nevertheless, a large amount of computation is consumed in the process of image preprocessing and pattern recognition, so it is difficult to process in real time in an embedded environment. In addition, there is a disadvantage in that the recognition rate greatly depends on the change of the road environment or the traveling environment.

SUMMARY

It is an embodiment of the present disclosure to provide an apparatus and a method for recognizing a traffic sign that more effectively recognize a traffic sign on a road image detected by a camera using a neuromorphic system.

In accordance with one aspect of the present disclosure, an apparatus for recognizing traffic signs may be provided, that includes an image sensor unit for acquiring an image frame, a neuromorphic system in which a plurality of neurons storing a feature pattern vector capable of specifying a sign such as an edge of a traffic sign and a content pattern vector related to content information of the traffic sign are connected by a parallel bus, and a control unit that (a) sets a certain region as a region of interest based on an upper end of the image frame inputted from the image sensor unit, (b) normalizes a window of a first size, which is preset for the set region of interest, by making the window slide in such a way to overlap by a first pixel value, (c) generates a first input vector that vectorizes the normalized window, (d) inputs the generated first input vector to the neuromorphic system, (e) extracts a candidate region of the traffic sign based on feature pattern information of a neuron having a feature pattern vector most similar to the inputted first input vector among the plurality of neurons stored in the neuromorphic system, (f) stores the coordinates of the extracted traffic sign candidate region, (g) converts the image size of the extracted candidate region, (h) normalizes a window of a second size, which is preset for the candidate region of the converted image size, by making the window slide in such a way to overlap by a second pixel value, (i) generates a second input vector that vectorizes the normalized window, (j) inputs the generated second input vector to the neuromorphic system, (k) determines traffic sign content information of a neuron having a content pattern vector most similar to the inputted second input vector among the plurality of neurons stored in the neuromorphic system, (l) stores the determined traffic sign content information, (m) performs processes (a) to (l) until the traffic sign is beyond the field of view, and (n) recognizes the location and content of the traffic sign based on the coordinates of the stored candidate regions and the content information of the stored traffic sign when the traffic sign disappears.

Further, a region corresponding to 70% on the basis of the upper end of the image frame inputted from the image sensor unit may be set as the region of interest.

Further, the control unit may recognize the location and content of the traffic sign by using a mode value among the coordinates of the stored traffic sign candidate regions and the traffic sign content information determined in the candidate regions or by weighting the coordinates of the traffic sign candidate region extracted from the last image frame and the traffic sign content information determined in the extracted traffic sign candidate region.

In accordance with another aspect of the present disclosure, a method for recognizing traffic signs by using an image sensor unit for acquiring an image frame and a neuromorphic system in which a plurality of neurons storing a feature pattern vector capable of specifying a sign such as an edge of the traffic sign and a content pattern vector related to content information of the traffic sign are connected by a parallel bus may be provided, that includes (a) setting a certain region as a region of interest based on an upper end of the image frame inputted from the image sensor unit, (b) normalizing a window of a first size, which is preset for the set region of interest, by making the window slide in such a way to overlap by a first pixel value, (c) generating a first input vector that vectorizes the normalized window, (d) inputting the generated first input vector to the neuromorphic system, (e) extracting a candidate region of the traffic sign based on feature pattern information of a neuron having a feature pattern vector most similar to the inputted first input vector among the plurality of neurons stored in the neuromorphic system, (f) storing the coordinates of the extracted traffic sign candidate region, (g) converting the image size of the extracted candidate region, (h) normalizing a window of a second size, which is preset for the candidate region of the converted image size, by making the window slide in such a way to overlap by a second pixel value, (i) generating a second input vector that vectorizes the normalized window, (j) inputting the generated second input vector to the neuromorphic system, (k) determining traffic sign content information of a neuron having a content pattern vector most similar to the inputted second input vector among the plurality of neurons stored in the neuromorphic system, (l) storing the determined traffic sign content information, (m) performing processes (a) to (l) until the traffic sign is beyond the field of view, and (n) recognizing the location and content of the traffic sign based on the coordinates of the stored candidate regions and the content information of the stored traffic sign when the traffic sign disappears.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to clearly illustrate the present disclosure, parts not related to the description are omitted from the drawings, and in the drawings, the width, length, thickness, and the like of components may be exaggerated for the sake of convenience. Like reference numerals refer to like elements throughout the specification.

In general, there are hundreds of billions of nerve cells (i.e., neurons) in the brain, which are composed of a complex nerve network. Neurons exert their intellectual abilities such as learning and memory through synapses that exchange signals with thousands of other neurons. Neurons are the structural and functional units of a nervous system and a basic unit of information transmission. Synapse indicates the junction between neurons and refers to the area where the axons of one neuron are connected to the dendrites of other neurons. One neuron is connected to thousands of other neurons via synapses.

A neuromorphic system is a device such as a semiconductor circuit designed to simulate the brain's processing of information by making an artificial nervous system imitate a biological nervous system at the neuron level. The neuromorphic system uses artificial neurons that imitate the biological neuronal structure described above and simplify the function of a biological neuron.

The neuromorphic system is in a trend of being used in intelligent systems that can adapt itself to an unspecified environment, for example, computers, robots, home appliances, autonomous vehicles and the like that perform voice recognition, danger recognition, real-time high speed signal processing, recognition and estimation, and the like.

An apparatus for recognizing traffic signs according to an embodiment of the present disclosure learns patterns representing features of a sign on thousands of neurons constituting a neuromorphic system. The learning patterns of a sign to be learned can be roughly divided into two types. One is a feature pattern (for example, an edge region; in the embodiment of the present disclosure, the feature pattern is referred to as a 'non-character partial region pattern') that can specify a sign at a distance, and the other is a sign content pattern (in the embodiment of the present disclosure, the content pattern is referred to as a 'character region pattern') such as a speed sign or an arrow, a prohibition sign and the like for identifying the type of sign. In the case where the sign is located tar away, some regions of the sign such as a red edge region are quickly searched to identify the candidate region where the sign will exist. If necessary, the candidate region may be resized, such as enlargement/reduction, and the candidate region may be gradually reduced by comparing the entire corresponding region with the sign type pattern.

When the type of the sign is recognized in this process, the determination result is stored in a candidate region management stack 14, and the above process is repeated until the sign disappears on the screen. After the sign disappears, the determination values of the candidate region management stack storing all of the determination results are analyzed and the final recognition result is output to a user. At this time, the determination may be made through an operation such as a mode value.

Figure 1:
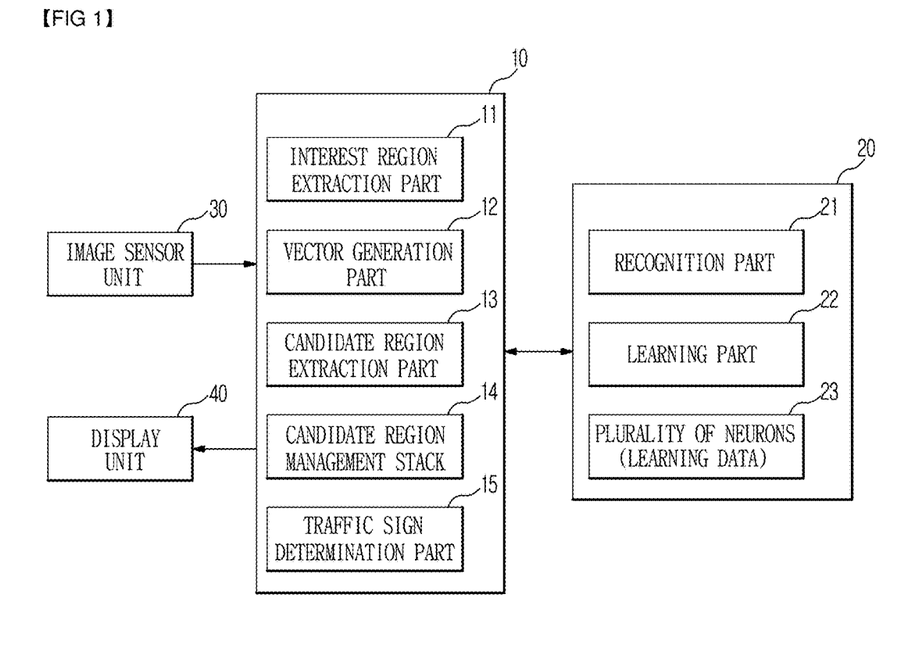
FIG. 1 is a control block diagram of an apparatus for recognizing traffic signs according to an embodiment of the present disclosure.

FIG. 1 is a control block diagram of an apparatus for recognizing traffic signs according to an embodiment of the present disclosure.

Referring to FIG. 1, an apparatus for recognizing traffic signs may include a control unit 10, a neuromorphic hardware unit 20 that is a neuromorphic system, an image sensor unit 30, and a display unit 40.

In the control unit 10, the neuromorphic hardware unit 20, the image sensor unit 30, and the display unit 40 are electrically connected.

The control unit 10 sets a certain region of an image frame inputted from the image sensor unit 30 as a region of interest.

The control unit 10 normalizes a window of a first size, which is preset for the set region of interest, by making the window slide in such a way to overlap by a first pixel value.

The control unit 10 generates a first input vector that vectorizes the normalized window.

The control unit 10 inputs the generated first input vector to the neuromorphic hardware unit 20.

The control unit 10 extracts a candidate region of the traffic sign based on feature pattern information of a neuron having a feature pattern vector most similar to the inputted first input vector among a plurality of neurons stored in the neuromorphic hardware unit 20.

The control unit 10 stores coordinates of the extracted traffic sign candidate region.

The control unit 10 converts an image size of the extracted candidate region.

The control unit 10 normalizes a window of a second size, which is preset for the candidate region of the converted image size, by making the window slide in such a way to overlap by a second pixel value.

The control unit 10 generates a second input vector that vectorizes the normalized window.

The control unit 10 inputs the generated second input vector to the neuromorphic hardware unit 20.

The control unit 10 determines traffic sign content information of a neuron having a content pattern vector most similar to the inputted second input vector among the plurality of neurons stored in the neuromorphic hardware unit 20.

The control unit 10 stores the determined traffic sign content information.

The control unit 10 repeatedly performs the above processes until the traffic sign is beyond the field of view.

The control unit 10 recognizes the location and content of the traffic sign based on the coordinates of the stored candidate regions and the content information of the stored traffic sign when the traffic sign disappears.

The control unit 10 may include an interest region extraction part 11, a vector generation part 12, a candidate region extraction part 13, the candidate region management stack 14, and a traffic sign determination part 15.

The neuromorphic hardware unit 20 may include a learning part 22, a recognition part 21, and a plurality of neurons 23. The learning part 22 functions to store the feature patterns and the content patterns of the previously learned signs in the plurality of neurons 23.

Figure 2:
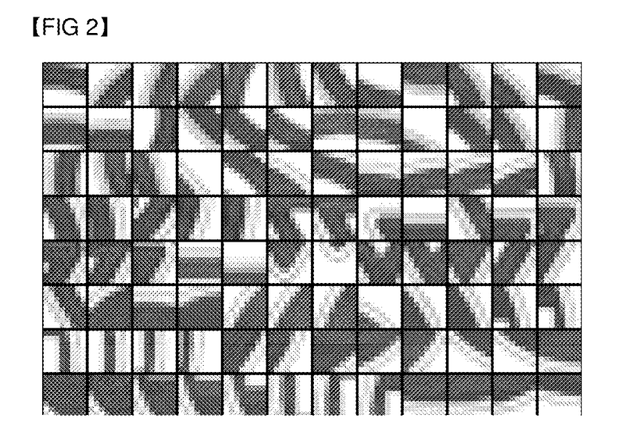
FIG. 2 is a diagram showing learning data obtained by learning a non-character partial region of a traffic sign in an apparatus for recognizing traffic signs according to an embodiment of the present disclosure.
Figure 3:
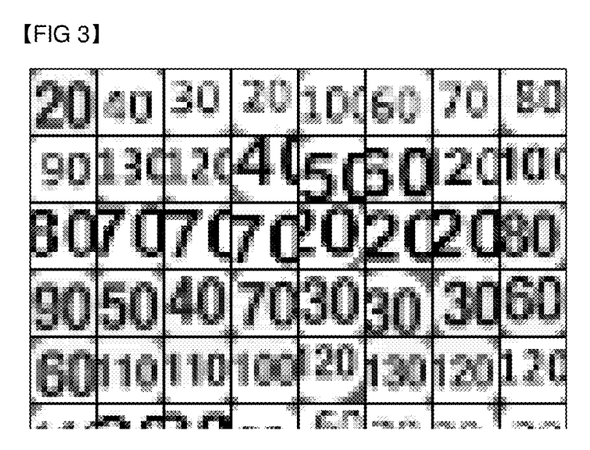
FIG. 3 is an illustration showing learning data obtained by learning a character region of a traffic sign in an apparatus for recognizing traffic signs according to an embodiment of the present disclosure.

FIG. 2 is a view showing learning data obtained by learning a non-character partial region of a traffic sign in an apparatus for recognizing traffic signs according to an embodiment of the present disclosure, and FIG. 3 is an illustration showing learning data obtained by learning a character region of a traffic sign in an apparatus for recognizing traffic signs according to an embodiment of the present disclosure.

Referring to FIGS. 2 and 3, the learning part 22 divides sign learning data into two categories and learns them. The two categories are a non-character partial region of a traffic sign and a character region of the traffic sign. The learning data size for the non-character partial region is, for example, 16×16. The learning data size for the character region is, for example, 32×32.

The learning part 22 learns data acquired in various environments such as illumination, luminance, position change, and angle change, thereby reducing the sensitivity to changes in the camera shooting environment.

The learning part 22 stores the learning data for the non-character partial region and the learning data for the character region in the plurality of neurons 23. According to such learning result, in the plurality of neurons 23 are stored a feature pattern vector capable of specifying a traffic sign such as an edge of the traffic sign and a content pattern vector related to content information of the traffic sign.

Referring back to FIG. 1, the interest region extraction part 11 of the control unit 10 performs a function to set a region of interest (ROI) in an image signal inputted from the image sensor unit 30 and extract only the image of the corresponding portion.

While a window of a predetermined size is repeatedly slid in such a way to overlap along the region of interest set in the above process, the vector generation part 12 of the control unit 10 converts pixel values of the corresponding window into a vector form. At this time, the vector generation part 12 performs an equalization process so that each window has robustness against a change in brightness or a change in color, performs a normalization process using a histogram smoothing or a min-max equalization method, and converts the normalized window into a vector form of a [1×N] size. The vector generation part 12 performs a function to transmit the generated vector to the neuromorphic hardware unit 20.

In the neuromorphic hardware unit 20, the plurality of neurons 23 in which a feature pattern vector capable of specifying a sign such as an edge of a traffic sign and a content pattern vector related to content information of the traffic sign are stored are connected by a parallel bus. The plurality of neurons 23 include multiple neurons in which a feature pattern vector capable of specifying a sign such as an edge of a traffic sign is stored, and multiple neurons in which a content pattern vector related to content information of the traffic sign is stored.

The recognition part 21 of the neuromorphic hardware unit 20 receives an input vector and simultaneously propagates the input vector to the entirety of neurons through the parallel bus. Each neuron automatically calculates the relative distance between the input vector received and the learned pattern vector stored in each neuron and sends it as a result. At this time, each neuron begins to measure the relative distance between the input vector and the pattern vector stored in the neuron when the input vector begins to be input, and continuously updates the distance value until input of the input vector is completed. Finally, when the calculation of the distance between the input vector and the stored pattern is completed, the recognition part 21 determines a neuron having the smallest relative distance value among thousands of neurons and transmits a return value corresponding to the learning pattern vector stored in the neuron.

The recognition part 21 outputs the result values divided into two kinds of contexts based on the pattern of the learned learning part 22. In a case of searching the entire region of interest for extracting candidate regions, the recognition part 21 performs a recognition mode by calculating the relative distance between the input vector and the feature pattern vector learned as the non-character partial region (e.g., edge) on the sign. On the other hand, in the case of the sign content determining step, the recognition part 21 performs a recognition mode by calculating the relative distance between the input vector and the content pattern vector learned as the character region (e.g., maximum speed, U-turn arrow and the like) of the sign.

The candidate region extraction part 13 of the control unit 10 synthesizes the recognition results of the recognition part 21 for the entire ROI when performing an operation for extracting candidate regions, and stores the coordinates of the region where the sign may exist in the candidate region management stack 14. The candidate region extraction part 13 also resizes the corresponding regions according to the reference size, and transmits the entire region to the recognition part 21 to determine the content of the sign. The result is also stored in the stack.

The candidate region management stack 14 of the control unit 10 performs a function to store data obtained by synthesizing the results recognized and returned by the recognition part 21 of the neuromorphic hardware unit 20. The data stored in the candidate region management stack 14 is input to the traffic sign determination part 15.

The traffic sign determination part 15 of the control unit 10 synthesizes the search result stacks after the sign which has been tracked and managed disappears from the screen, and determines the position and contents of the sign. As an example, a method of calculating the mode value of the resultant values stored in the candidate region management stack 14 or a method of weighting and determining the result of the last frame that may have the highest recognition probability may be used.

The display unit 40 outputs the result received from the traffic sign determination part 15 as time information.

Figure 4:
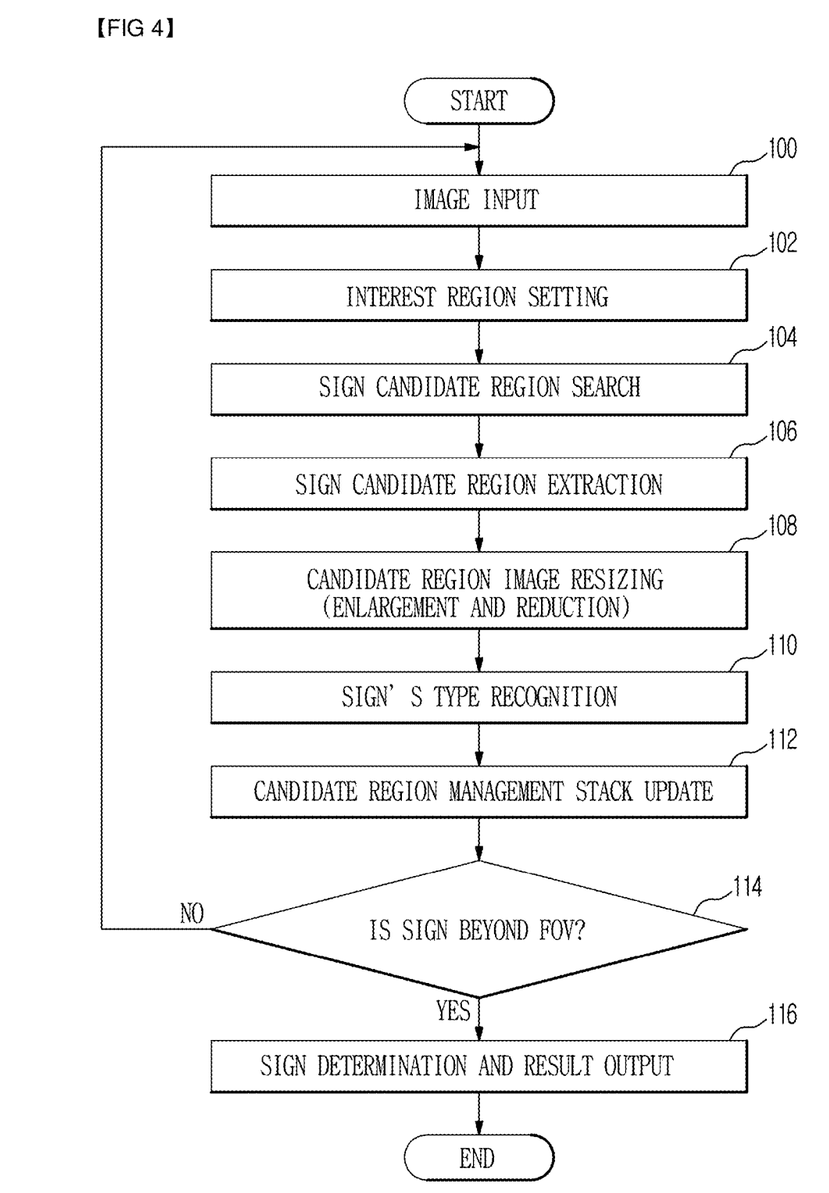
FIG. 4 is a control flow chart of an apparatus for recognizing traffic signs according to an embodiment of the present disclosure.

FIG. 4 is a control flow chart of an apparatus for recognizing traffic signs according to an embodiment of the present disclosure.

Referring to FIG. 4, a step 100 of inputting an image, a step 102 of setting a region of interest, a step 104 of searching a candidate region of a sign, a step 106 of extracting a sign candidate region, a step 108 of resizing the candidate region image, a step 110 of recognizing a type of the sign, a step 112 of updating the candidate region management stack using the sign recognition result, a step 114 of determining whether the sign is beyond the field of view (FOV), and a step 116 of determining the sign and outputting the determination result may be included.

In the image inputting step 100, the interest region extraction part 11 receives the image outputted from the image sensor unit 30.

In the interest region setting step 102, the interest region extraction part 11 extracts only the image of the corresponding portion by setting the region of interest in the image inputted by the image sensor unit 30.

Figure 5:
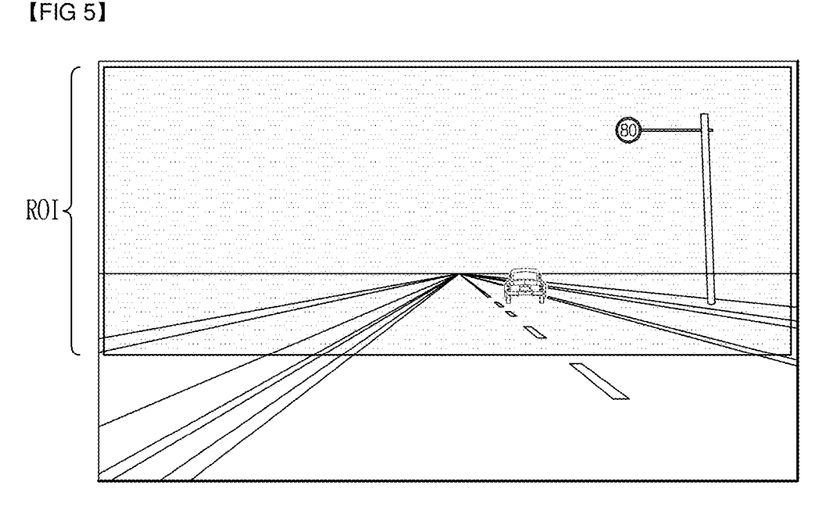
FIG. 5 is a view for explaining a region of interest set in an image inputted in an apparatus for recognizing traffic signs according to an embodiment of the present disclosure.

FIG. 5 is a view for explaining a region of interest set in an image inputted in an apparatus for recognizing traffic signs according to an embodiment of the present disclosure.

Referring to FIG. 5, a region excluding the region where the sign cannot exist in an image inputted from the image sensor unit 30 is set as a region of interest.

For example, in the case where the remaining region except the region where a sign cannot exist is designated as a region of interest (ROI), the top 70% region of the image may be set as the region of interest (ROI).

Referring back to FIG. 4, in the sign candidate region searching step 104, while a window of a predetermined size is repeatedly slid in such a way to overlap along the region of interest set in inputted image, the vector generation part 12 converts pixel values of the corresponding window into a vector form.

The window size is set equal to the image size of 'the non-character partial region' learned in a neuron. For example, if 'the non-character partial region' image of a 16×16 size is learned in a neuron, pixel values are read by repeatedly making windows of a 16×16 size slide in X-axis and Y-axis directions in such a way to overlap every 8 pixels by 50%. The generated vector is inputted to the recognition part 21 of the neuromorphic hardware unit 20.

The recognition part 21 compares the interest region vector inputted from the vector generation part 12 with the non-character partial region pattern, and returns the category value corresponding thereto if the similarity degree is higher than a reference value. The return value is input to the candidate region extraction part 13 of the control unit 10 again.

Figure 6:
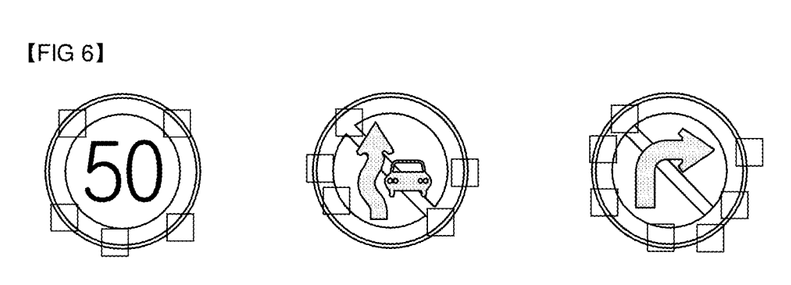
FIG. 6 is a view illustrating learning patterns for selecting traffic sign candidate regions in an apparatus for recognizing traffic signs according to an embodiment of the present disclosure.
Figure 7:
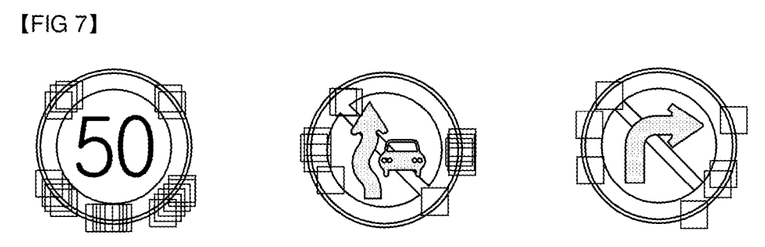
FIG. 7 is a view illustrating a result of searching traffic sign candidate regions in an apparatus for recognizing traffic signs according to an embodiment of the present disclosure.

FIG. 6 is a view illustrating learning patterns for selecting traffic sign candidate regions in an apparatus for recognizing traffic signs according to an embodiment of the present disclosure, and FIG. 7 is a view illustrating a result of searching traffic sign candidate regions in an apparatus for recognizing traffic signs according to an embodiment of the present disclosure.

Referring to FIGS. 6 and 7, the rectangular boxes shown in FIG. 6 represent a learning pattern for selecting non-character partial regions in the traffic sign candidate region, and the rectangular boxes shown in FIG. 7 represent a result of searching non-character partial regions in the traffic sign candidate region.

Referring back to FIG. 4, in the sign candidate region extracting step 106, the candidate region extraction part 13 extracts candidate regions corresponding to the return values based on the return values inputted from the recognition part 21. The candidate region extraction part 13 stores the coordinates of the extracted candidate regions in the candidate region management stack 14, respectively.

In the extracted candidate region image resizing step 108, the candidate region extraction part 13 performs a size conversion operation to match the extracted candidate regions with a reference size, and provides the candidate regions to the vector generation part 12.

Figure 8:
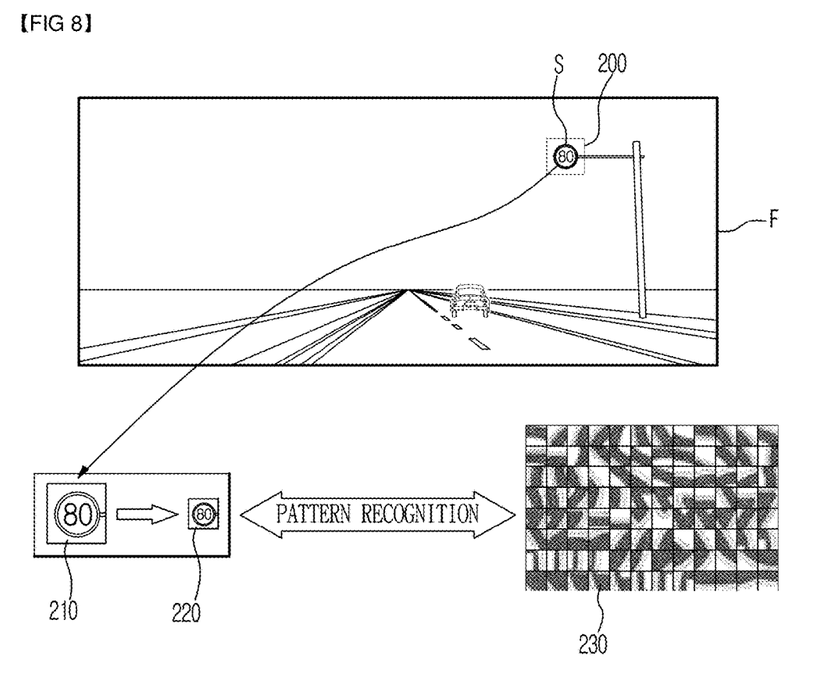
FIG. 8 is a view for explaining precisely searching traffic sign candidate regions in an apparatus for recognizing traffic signs according to an embodiment of the present disclosure.

The candidate region extraction part 13 performs a size conversion operation such as enlargement/reduction on the extracted candidate region, and inputs the candidate region to the vector generation part 12 (refer to FIG. 8).

Referring back to FIG. 4, in the sign type recognizing step 110, while a window of a predetermined size is repeatedly slid in such a way to overlap along the size-converted candidate region inputted by the candidate region extraction part 13, the vector generation part 12 converts pixel values of the corresponding window into a vector form. The window size is set equal to the image size of the character region learned in a neuron. For example, if the character region image of a 32×32 size is learned in a neuron, pixel values are read by repeatedly making windows of a 32×32 size slide in X-axis and Y-axis directions in such a way to overlap every 4 pixels by 12.5%. The generated vector is inputted to the recognition part 21 of the neuromorphic hardware unit 20.

The recognition part 21 compares the size-converted candidate region input vector with the character region pattern, and returns the category value corresponding thereto if the similarity degree is higher than a preset value. The mode value among the returned category values is input to the candidate region management stack 14.

FIG. 8 is a view for explaining precisely searching traffic sign candidate regions in an apparatus for recognizing traffic signs according to an embodiment of the present disclosure.

Referring to FIG. 8, an identification number 200 on a sign S of an image frame F indicates a candidate region determined by the recognition part 21 that a feature pattern exists on the sign as a result of searching for the region of interest. An identification number 210 indicates that the candidate region is extracted from the image frame. An identification number 220 indicates a result of resizing the extracted candidate region to be used for the sign determination. An identification number 230 indicates a learning pattern stored in the plurality of neurons 23.

Assuming that 10 return values of an '80 km' sign and two return values of '60 km' sign are outputted as a result of inputting the size-converted vector to the recognition part 21, the mode value of 80 km is returned as the candidate region search result and inputted to the candidate region management stack 14.

Referring back to FIG. 4, in the candidate region management stack update step 112, the coordinates of the candidate region detected through the above process and the type of the determined sign are stored in the candidate region management stack 14.

In the step 114 of determining whether the sign is beyond the field of view (FOV), the traffic sign determination part 15 determines whether the sign that has been tracked and managed disappeared from the screen.

If the sign does not disappear from the screen as a result of the determination in the operation mode 114, it is returned to the operation mode 100 to perform the subsequent operation modes.

Figure 9:
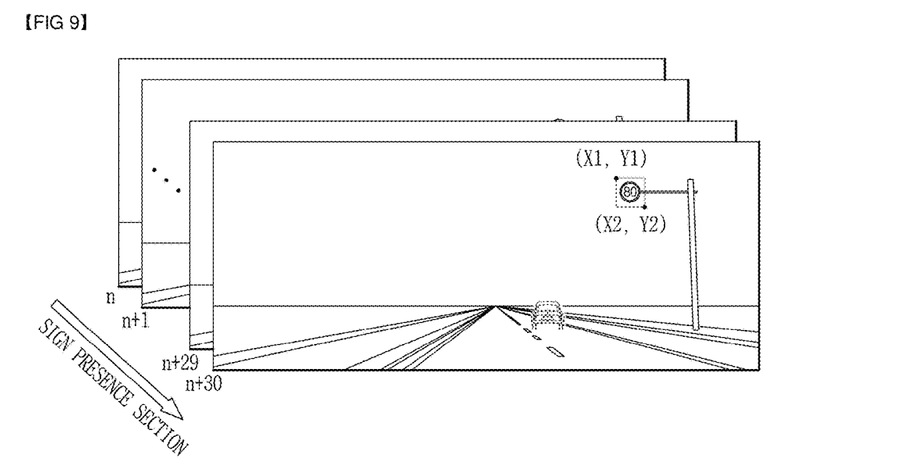
FIG. 9 is a view for explaining tracing of a traffic sign in each image frame in an apparatus for recognizing traffic signs according to an embodiment of the present disclosure.
Figure 10:
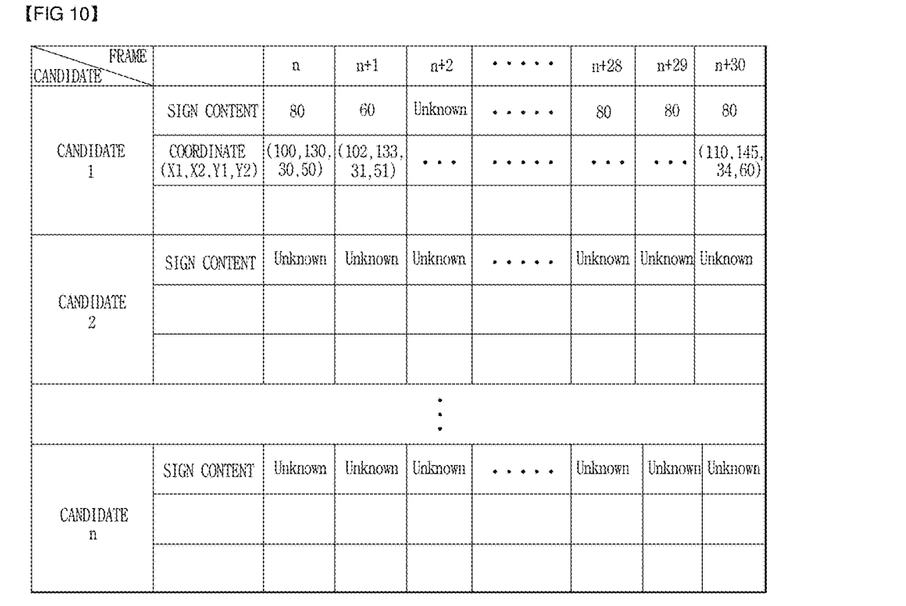
FIG. 10 is a view for explaining data stored in a traffic sign candidate region management stack in an apparatus for recognizing traffic signs according to an embodiment of the present disclosure.

On the other hand, if the sign disappears from the screen as a result of the determination in the operation mode 114, in the signboard determination and result output step 116 the traffic sign determination part 15 determines the type of the sign by synthesizing the search result stacks after the sign that has been tracked and managed disappears from the screen. That is, the traffic sign determination part 15 synthesizes the contents of the candidate region management stack 14 to determine whether or not there is a candidate satisfying the sign determination criterion. As an example of the sign determination criterion, a method of calculating the mode value of the resultant values stored in the candidate region management stack 14 or a method of weighting and determining a result confirmed in the last image frame that may have the highest recognition probability may be used (refer to FIGS. 9 and 10).

The traffic sign determination part 15 outputs the final recognition result to the display unit 40 when there is a candidate satisfying the sign determination criterion.

As is apparent from the above, the embodiments of the present disclosure can replace the existing image processing algorithms that have consumed a large amount of computation by learning in advance a non-character region and a character region of a traffic sign exposed to various environments using the neuromorphic system and then by recognizing a traffic sign from a road image photographed by a camera through the learned data, thereby increasing the TSR execution speed and securing a high recognition rate even in the case of partial distortion and damage of traffic signs.

The embodiments of the present disclosure can relatively reduce the reliance on the CPU and the DSP by using the neuromorphic system, thereby achieving the effect of cost reduction and heat generation reduction.

The embodiments of the present disclosure can easily develop country-specific TSR systems by acquiring country-specific learning data even in the case of signs having different standards by country.

What is claimed is:

1. An apparatus for recognizing traffic signs comprising:
an image sensor unit for acquiring an image frame;
a neuromorphic system in which a plurality of neurons storing a feature pattern vector capable of specifying a sign including an edge of a traffic sign and a content pattern vector related to content information of the traffic sign are connected by a parallel bus; and
a controller that (a) sets a certain region as a region of interest based on an upper end of the image frame inputted from the image sensor unit, (b) normalizes a window of a first size, which is preset for the set region of interest, by moving the window in such a way to overlap by a first number of pixels, (c) generates a first input vector that vectorizes the normalized window, (d) inputs the generated first input vector to the neuromorphic system, (e) extracts a candidate region of the traffic sign based on feature pattern information of a neuron having a feature pattern vector most similar to the inputted first input vector among the plurality of neurons stored in the neuromorphic system, (f) stores the coordinates of the extracted traffic sign candidate region, (g) converts the image size of the extracted candidate region, (h) normalizes a window of a second size, which is preset for the candidate region of the converted image size, by moving the window in such a way to overlap by a second number of pixels, (i) generates a second input vector that vectorizes the normalized window, (j) inputs the generated second input vector to the neuromorphic system, (k) determines traffic sign content information of a neuron having a content pattern vector most similar to the inputted second input vector among the plurality of neurons stored in the neuromorphic system, (l) stores the determined traffic sign content information, (m) performs processes (a) to (l) until the traffic sign is beyond the field of view, and (n) recognizes the location and content of the traffic sign based on the coordinates of the stored candidate regions and the content information of the stored traffic sign when the traffic sign disappears.

2. The apparatus according to claim 1, wherein a region corresponding to 70% on the basis of the upper end of the image frame inputted from the image sensor unit is set as the region of interest.

3. The apparatus according to claim 1, wherein the controller recognizes the location and content of the traffic sign by using a mode value among the coordinates of the stored traffic sign candidate regions and the traffic sign content information determined in the candidate regions or by weighting the coordinates of the traffic sign candidate region extracted from a last image frame and the traffic sign content information determined in the extracted traffic sign candidate region.

4. A method for recognizing traffic signs by using an image sensor unit for acquiring an image frame and a neuromorphic system in which a plurality of neurons storing a feature pattern vector capable of specifying a sign including an edge of a traffic sign and a content pattern vector related to content information of the traffic sign are connected by a parallel bus, comprising:

(a) setting a certain region as a region of interest based on an upper end of the image frame inputted from the image sensor unit, (b) normalizing a window of a first size, which is preset for the set region of interest, by moving the window in such a way to overlap by a first number of pixels, (c) generating a first input vector that vectorizes the normalized window, (d) inputting the generated first input vector to the neuromorphic system, (e) extracting a candidate region of the traffic sign based on feature pattern information of a neuron having a feature pattern vector most similar to the inputted first input vector among the plurality of neurons stored in the neuromorphic system, (f) storing the coordinates of the extracted traffic sign candidate region, (g) converting the image size of the extracted candidate region, (h) normalizing a window of a second size, which is preset for the candidate region of the converted image size, by moving the window in such a way to overlap by a second number of pixels, (i) generating a second input vector that vectorizes the normalized window, (j) inputting the generated second input vector to the neuromorphic system, (k) determining traffic sign content information of a neuron having a content pattern vector most similar to the inputted second input vector among the plurality of neurons stored in the neuromorphic system,
(l) storing the determined traffic sign content information,
(m) performing processes (a) to (l) until the traffic sign is beyond the field of view, and
(n) recognizing the location and content of the traffic sign based on the coordinates of the stored candidate regions and the content information of the stored traffic sign when the traffic sign disappears.

5. The method according to claim 4, wherein a region corresponding to 70% on the basis of the upper end of the image frame inputted from the image sensor unit is set as the region of interest.

6. The method according to claim 4, further comprising: recognizing the location and content of the traffic sign by using a mode value among the coordinates of the stored traffic sign candidate regions and the traffic sign content information determined in the candidate regions or by weighting the coordinates of the traffic sign candidate region extracted from a last image frame and the traffic sign content information determined in the extracted traffic sign candidate region.

* * * * *